(12) United States Patent
Grinderslev

(10) Patent No.: US 9,588,302 B2
(45) Date of Patent: Mar. 7, 2017

(54) EXPANDED-BEAM CONNECTOR WITH MOLDED LENS

(75) Inventor: Soren Grinderslev, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 145 days.

(21) Appl. No.: 13/486,590

(22) Filed: Jun. 1, 2012

(65) Prior Publication Data

US 2013/0322821 A1 Dec. 5, 2013

(51) Int. Cl.
*G02B 6/26* (2006.01)
*G02B 6/38* (2006.01)
*G02B 6/32* (2006.01)
*G02B 6/42* (2006.01)

(52) U.S. Cl.
CPC ............. *G02B 6/3853* (2013.01); *G02B 6/32* (2013.01)

(58) Field of Classification Search
CPC .......... G02B 6/32; G02B 6/322; G02B 6/325; G02B 6/327; G02B 6/3853
USPC ..................................................... 385/33, 35
See application file for complete search history.

(56) References Cited

U.S. PATENT DOCUMENTS

| 4,290,667 A | * | 9/1981 | Chown ............................ 385/33 |
| 4,421,383 A | * | 12/1983 | Carlsen ........................... 385/79 |
| 4,531,810 A | * | 7/1985 | Carlsen ......................... 385/137 |
| 4,534,616 A | * | 8/1985 | Bowen et al. ................... 385/79 |
| 4,691,985 A | * | 9/1987 | Shank .................. G02B 6/3855 385/79 |
| 4,711,518 A | * | 12/1987 | Shank ..................... G02B 6/322 385/79 |
| 4,718,744 A | | 1/1988 | Manning |
| 4,770,488 A | | 9/1988 | Shank et al. |
| 4,822,129 A | * | 4/1989 | Webb .............................. 385/79 |
| 4,830,454 A | * | 5/1989 | Karstensen .......... G02B 6/4206 359/664 |
| 4,834,494 A | * | 5/1989 | DeMeritt et al. ............... 385/61 |
| 4,925,267 A | * | 5/1990 | Plummer et al. ............... 385/74 |
| 4,953,938 A | * | 9/1990 | Buhrer et al. .................. 385/33 |
| 5,185,836 A | * | 2/1993 | Baker ............................. 385/61 |

(Continued)

FOREIGN PATENT DOCUMENTS

| EP | 0 053 914 A1 | 6/1982 |
| EP | 0 220 690 A2 | 5/1987 |

(Continued)

OTHER PUBLICATIONS

International Search Report, International Application No. PCT/US2013/039795, International Filing Date, May 7, 2013.

*Primary Examiner* — Rhonda Peace

(57) ABSTRACT

An expanded-beam connector comprising a sleeve for holding at least one fiber and one lens body, the sleeve having an interior surface having a certain geometry, a fiber having a fiber end face, and a lens body, the lens body being formed with a first face and a second face, the first and second faces being substantially planar, the first face having an interface point for optically coupling with the fiber end face, the second face having a convex surface, the interface point and the convex surface being optically coupled through the lens body, the lens body having an outer periphery at least a portion of which has the certain geometry such that the lens body is held in a precise radial position relative to the sleeve when disposed in the sleeve.

21 Claims, 2 Drawing Sheets

(56) References Cited

U.S. PATENT DOCUMENTS

| | | | |
|---|---|---|---|
| 5,210,815 A * | 5/1993 | Alexander et al. | 385/138 |
| 5,247,595 A * | 9/1993 | Foldi | 385/78 |
| 5,274,502 A * | 12/1993 | Demerritt | C03B 11/08 |
| | | | 359/642 |
| 5,485,537 A * | 1/1996 | Jeong et al. | 385/60 |
| 5,526,455 A * | 6/1996 | Akita | G02B 6/4292 |
| | | | 385/33 |
| 5,606,182 A | 2/1997 | Yoshida et al. | |
| 6,549,704 B2 * | 4/2003 | Ukrainczyk | 385/33 |
| 6,632,025 B2 * | 10/2003 | Ukrainczyk | 385/70 |
| 6,694,077 B2 | 2/2004 | Liu et al. | |
| 6,798,949 B2 * | 9/2004 | Liu | G02B 6/2937 |
| | | | 385/33 |
| 7,343,068 B2 * | 3/2008 | Shigenaga et al. | 385/33 |
| 7,474,822 B2 * | 1/2009 | Kobayashi et al. | 385/35 |
| 7,771,128 B2 * | 8/2010 | Kojima | G02B 6/255 |
| | | | 385/53 |
| 7,775,725 B2 * | 8/2010 | Grinderslev | 385/74 |
| 7,986,861 B2 * | 7/2011 | Shimotsu | 385/33 |
| 7,991,252 B2 * | 8/2011 | Cheng et al. | 385/25 |
| 8,454,243 B2 * | 6/2013 | Hsu | G02B 6/32 |
| | | | 385/74 |
| 8,675,284 B2 * | 3/2014 | Kadar-Kallen | G02B 3/00 |
| | | | 359/664 |
| 2002/0009261 A1 * | 1/2002 | Bhagavatula et al. | 385/35 |
| 2003/0012513 A1 * | 1/2003 | Ukrainczyk | 385/61 |
| 2003/0021543 A1 * | 1/2003 | Mann et al. | 385/74 |
| 2003/0185497 A1 | 10/2003 | Zhou | |
| 2004/0258364 A1 * | 12/2004 | Frojdh et al. | 385/74 |
| 2009/0324176 A1 * | 12/2009 | Cheng et al. | 385/73 |
| 2010/0027943 A1 * | 2/2010 | Armani et al. | 385/74 |
| 2010/0104244 A1 * | 4/2010 | Grinderslev | 385/74 |
| 2012/0300312 A1 * | 11/2012 | Kadar-Kallen | G02B 3/00 |
| | | | 359/664 |
| 2013/0322821 A1 * | 12/2013 | Grinderslev | 385/33 |

FOREIGN PATENT DOCUMENTS

| | | |
|---|---|---|
| FR | 2 334 969 A1 | 7/1977 |
| GB | 2 180 955 A | 4/1987 |
| JP | 2004-302453 A | 10/2004 |
| JP | 2005-316295 A | 11/2005 |

* cited by examiner

PRIOR ART

EXPANDED-BEAM CONNECTOR WITH MOLDED LENS

FIELD OF INVENTION

The present invention relates generally to an expanded-beam optical connector, and, more particularly, to an expanded-beam plug and receptacle termini-type optical connector.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber end face, thereby increasing reflective loss and scattering.

To avoid problems of debris in the optical path and vibration, a connector has been developed which expands the optical beam and transmits it over an air gap between the connectors. By expanding the beam, its relative size increases with respect to the debris, making the beam less sensitive to the interference caused by the debris. Further, transmitting the beam over an air gap eliminates component-to-component wear, thereby increasing the connector's tolerance to vibration. Over the years, the expanded-beam connector has evolved into a ruggedized multi-fiber connector comprising an outer housing, which is configured to mechanically interengaged with the outer housing of a mating connector, typically through a screw connection. Contained within the outer housing are a number of inner assemblies or "terminus."

An example of a terminus 400 is shown in FIGS. 4a and 4b. Each terminus 400 comprises a sleeve 401, a ferrule assembly 408 contained within the sleeve 401 and adapted to receive a fiber 402, and a ball lens 440 at a mating end of the sleeve 401 optically coupled to the fiber 402. The ball lens serves to expand and collimate light through (or near) the connector interface. When two expanded-beam connectors are mated as shown in FIG. 4b, the terminus 400 is mated with a similar connector 400' such that there is an air gap 421 between the ball lens 440, 440' of each terminus 400, 400'. Such a connector is disclosed, for example, in U.S. Pat. No. 7,775,725 (herein the "'725 patent") incorporated by reference in its entirety.

As mentioned above, the beam is expanded and focused by virtue of a glass lens. In a multi-mode embodiment, shown in FIGS. 4(a) and (b), a spacer 480 is used to space the fiber end face a distance away from the lens surface at the focal point of the ball lens. For a single-mode expanded-beam connector 500 configuration, shown in FIGS. 5(a) and (b), a glass material is used to produce a ball lens that has a focal point 590 precisely on the lens surface 540a so that the fiber end face can be brought in direct physical contact with the lens and prevent an air gap and reduce back reflection. Thus, the glass lens used for a single-mode expanded beam application is different from a multi-mode lens and is typically more expensive.

Regardless of whether the lens is configured for use in a multi-mode or single-mode connector, it is the most expensive component in the connector system. For large production quantities, it is therefore desirable to find a less expensive lens option. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention involves an inexpensive molded lens body in which configurable features are readily molded into the body to provide the desired optical and alignment properties. Specifically, a lens is molded into the lens body to precisely position the focal point of the lens on the lens body surface such that the fiber can be brought into physical contact with the lens to avoid an air gap, thereby reducing back reflection. Furthermore, the body is molded with periphery features, such that when disposed within a sleeve, the molded lens body is precisely aligned within the sleeve.

Accordingly, one aspect of the invention is an expanded-beam connector comprising a molded lens body. In one embodiment, the connector comprises: (1) a sleeve for holding at least one fiber and one lens body, the sleeve having an interior surface having a certain geometry; (2) a fiber having a fiber end face; and (3) a lens body, the lens body being molded with a first face and a second face, the first and second faces being substantially planar, the first face having an interface point for optically coupling with the fiber end face, the second face having a convex surface, the interface point and the convex surface being optically coupled through the lens body, the lens body having an outer periphery at least a portion of which has the certain geometry such that the lens body is held in a precise radial position relative to the sleeve when disposed in the sleeve.

Another aspect of the invention is a lens body having molded optical and alignment features. In one embodiment, the lens body is molded with a first face and a second face, the first and second faces being substantially planar, the first face having an interface point for optically coupling with a fiber end face, the second face defining at least one convex surface, the interface point and the convex surface being optically coupled through the lens body, the lens body having an outer periphery at least a portion of which has the certain geometry such that the lens body is held in a precise radial position relative to the sleeve when disposed in the sleeve.

In one embodiment, the molded lens body is configured to receive the fiber such that no polishing of a ferrule is required. In yet another embodiment, the lens body is configured to receive a buffered fiber, thereby not only eliminating the process step of polishing the ferrule, but also eliminating the ferrule altogether.

DETAILED DESCRIPTION

Figures 1A, 1B:
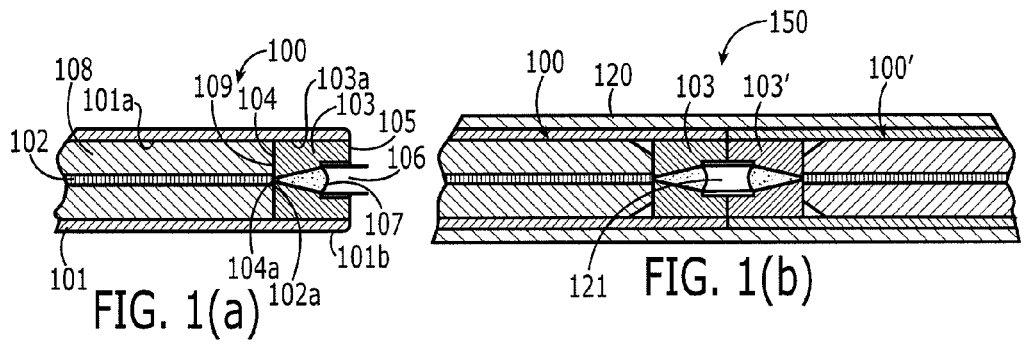
FIG. 1(a) shows one embodiment of the connector of the present invention having a molded lens body disposed in a sleeve and in physical contact with polished ferrule.
FIG. 1(b) shows the connector of FIG. 1(a) mated with a similar connector.

Referring to FIGS. 1(a) & (b), 2(a) & (b), and 3(a) & (b), various embodiments of the expanded-beam connector 100, 200, 300 of the present invention are shown. In each embodiment, the connector 100, 200, 300 comprises a sleeve 101 for holding at least one fiber 102, 202, 302 having a fiber end face 102a, 202a, 302a. The sleeve 101, which is essentially (although not necessarily) the same for each embodiment, has an interior surface 101a having a certain geometry. The connector 100, 200, 300 also comprises a lens body 103, 203, 303. The lens body 103, 203, 303 is molded with a first face 104, 204, 304 and a second face 105, 205, 305, the first and second faces being substantially planar. The first face has an interface point 104a, 204a, 304a for optically coupling with the fiber end face 102a, 202a, 302a. The second face has at least one lens, which, in this embodiment, is a convex surface 107, 207, 307. The focal point of each convex surface 107, 207, 307 is essentially at the interface point 104a, 204a, 304a, such that the convex surface and interface point are optically coupled through the lens body. The lens body 103, 203, 303 is also molded to define an outer periphery 103a, 203a, 303a, at least a portion of which has the certain geometry such that the lens body is held in a precise radial position relative to the sleeve 101 when disposed in the sleeve. These features and elements of the connector systems 100, 200 and 300 are considered in greater detail below.

Figures 2A, 2B:
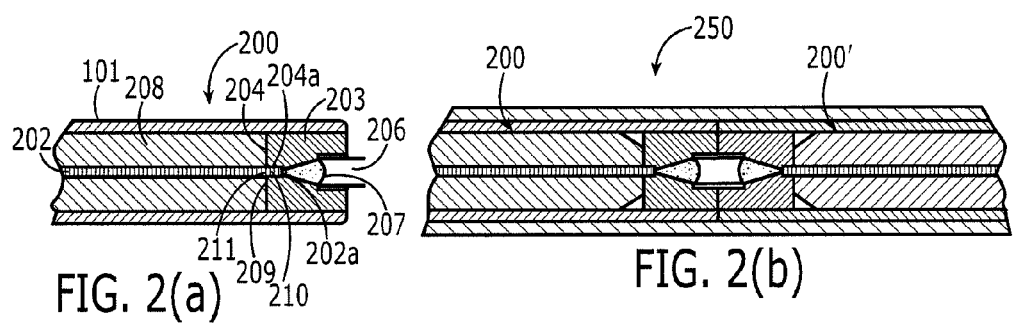
FIG. 2(a) is a variation of the connector of FIG. 1(a), in which a bare fiber protrudes from the end face of the ferrule and is received in a fiber-receiving cavity of the lens body, thereby eliminating the need for polishing the ferrule end face.
FIG. 2(b) shows the connector of FIG. 2(a) mated with a similar connector.
Figures 3A, 3B:
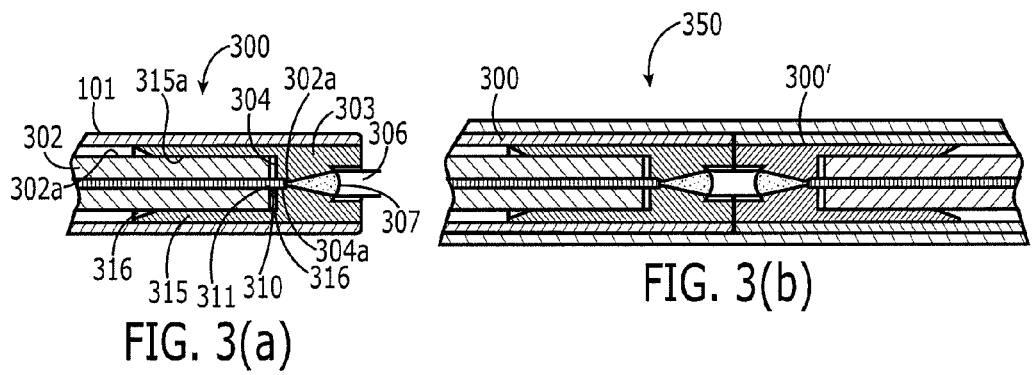
FIG. 3(a) shows another variation of the present invention in which a buffered fiber is configured to have a protruding bare fiber such which is received in a fiber-receiving cavity of the lens body, thereby avoiding the need for not only polishing, but also the ferrule itself.
FIG. 3(b) shows the connector of FIG. 3(a) mated with a similar connector.
Figure 4A:
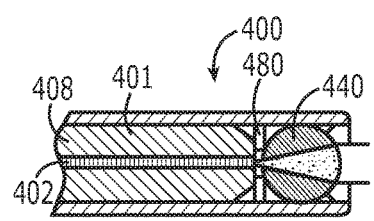
FIG. 4(a) and FIG. 4(b) show a prior art terminus.
Figure 4B:
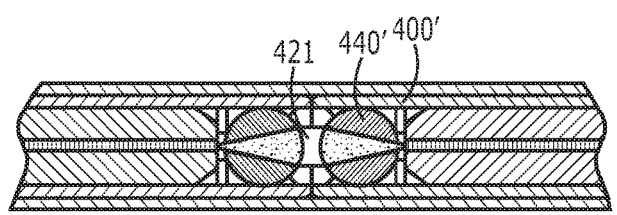
Figure 5A:
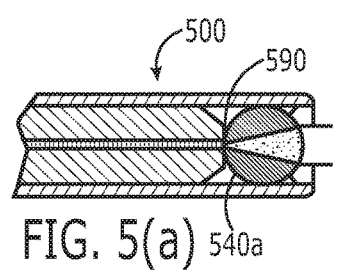
FIG. 5(a) and FIG. 5(b) shown a prior art single mode expanded beam connector.
Figure 5B:
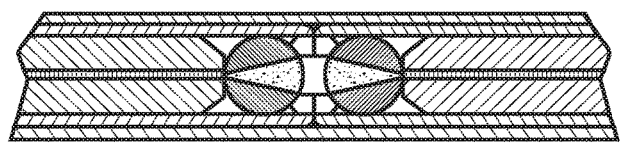

The sleeve 101 is essentially, although not necessarily, the same in all of the embodiments described above. The sleeve functions to hold and align the ferrule/fiber and the lens body. Although the sleeve 101 can be configured in any known way, typically it is configured as a cylindrical sleeve having a cylindrical interior geometry with a circular cross-section. In addition to having an inner geometry which functions to hold and align the ferrule/fiber and lens body as described above, the sleeve 101 also comprises an outer geometry 101b that is configured to be received and held by an outer sleeve 120 as shown in FIGS. 1(b), 2(b), and 3(b). Specifically, outer sleeve 120 has an inner geometry 120a, which is configured to receive and closely align the sleeve 101 to form a mated connector assembly 150 as shown in FIG. 1(b) (also shown in FIGS. 2(b) and 3(b)). In one embodiment, the sleeve is compliant. These compliant portions can be provided in different ways including, for example, using resilient materials or creating flexible beams.

The optical fiber 102, 202, 302 may be any known optical fiber including both glass and plastic fiber. Furthermore, the fiber may be configured with various cores to transmit various modes. Examples of suitable fibers include single mode, multimode, polarization-maintaining, and multicore fibers. Single mode, multimode, polarization-maintaining fibers are well known and commercially available. Multi-core fibers are more recent and comprise two or more cores in a common fiber. Suitable multi-core fibers include, for example, fibers having multiple cores in a common cladding, which are available from, for example, Corning Inc, OFS-Furukawa Electric Ltd, and Sumitomo Electric Ind. Alternatively, rather than defining the cores in a common cladding the cores may be defined by air channels running the length of the fiber. Cores defined in this way are referred to as photonic crystal structure cores or holey fiber cores. Such fibers are described, for example, in KAZUNORI MUKASA, ET AL., *Multi-Core Fibers for Large Capacity SDM*, Optical Fiber Conference 2011, OWJ1, hereby incorporated by reference.

In the embodiment in FIG. 1(a), the fiber 102 is held in a ferrule 108 in a known configuration. Ferrule 108 comprises an end face 109 which is polished to present a polished fiber end face 102a. Alternatively, as shown in FIG. 2(a), the fiber end face 202a of the ferrule 202 is not polished. More specifically, the ferrule 208 comprises a bore hole in which a bare fiber 202 is disposed such that a portion 210 of the bare fiber extends from the ferrule end face 209. Rather than polishing the ferrule end face to polish the fiber end face, in one embodiment, the fiber end face is cleaved to provide a smooth surface suitable for optical coupling. Methods for preparing a cleaved fiber protruding from a ferrule are known, and disclosed for example in U.S. Pat. No. 7,377,700, hereby incorporated by reference in its entirety. Thus, the ferrule assembly 208 can be prepared at a significant-reduced cost as polishing tends to be an expensive processing step in the preparation of a ferrule assembly.

In one embodiment, the ferrule comprises at least two bores in which each bore is adapted to hold a fiber. In another embodiment, the ferrule comprise one central bore of a size adapted to hold more than one fiber Furthermore, in an embodiment in which the fiber end face is laser cleaved, end-shaping techniques, such as those disclosed in U.S. Pat. No. 6,963,687 (hereby incorporated by reference in its entirety), may be used to shape the fiber end face with a lens or other structure to enhance optical coupling with the lens body. For example, for a single mode fiber with an air gap between the fiber and lens (see, e.g., FIG. 2), a slant or angle finish of the fiber end face will reduce the back reflection.

In yet another embodiment, the fiber is not held in a ferrule. Specifically, referring to FIG. 3(a), a ferrule-less embodiment of the connector 300 of the present invention is shown in which the connector 300 comprises a buffered fiber 302 having a bare portion 310 protruding from the end of the buffered fiber 302. Again, the protruding bare fiber 310 can be prepared using known techniques, including laser stripping.

A key aspect of the present invention is the molded lens body 103, 203 and 303 as shown in FIGS. 1(*a*), 2(*a*), and 3(*a*), respectively. The molded lens body performs one or more of the following functions: (1) it self aligns within the sleeve to be radially positioned with respect to the fiber, (2) it optically couples with the fiber, (3) it expands or focuses the beam between the fiber and a mating connector, and/or (4) it mechanically abuts a lens body of a mating connector to axially position the connector relative to the mating connector.

To facilitate alignment within the sleeve 101, the lens body comprises a periphery 103*a*, at least a portion of which is configured to be received and contact the interior surface 101*a* of the sleeve 100 such that the lens body 103 is radially aligned within the sleeve 101. Typically, although not necessarily, the radial sleeve has a cylindrical inside geometry having a circular cross-section as mentioned above. Accordingly, in one embodiment, at least a portion of the periphery 103*a* of the lens body 103 is configured to be received in the cylindrical sleeve. It is not critical that the entire periphery 103*a* contacts the interior 101*a* of the sleeve 101, but merely a sufficient portion to ensure that the lens body is held in alignment. For example, in one embodiment, the periphery 103*a* is cylindrical such that the entire portion contacts the interior surface 101*a*. In an alternative embodiment, 103*a* is fluted such that only the peaks of the fluted portions contact the periphery. In yet another embodiment, just a few (e.g. three or more) equidistant ribs on the periphery of the lens body contact the inner surface 101*a*. Still other embodiments will be apparent to those of skill in the art in light of this disclosure.

To optically couple with the fiber, the lens body has a first face defining an interface point, which is smooth for transmitting and receiving light to and from the fiber end face without significant loss or distortion. In one embodiment, the interface point is configured to make physical contact with the fiber end face. Accordingly, as described below, the focal point of the lens corresponding to the interface point is disposed at or near the surface of the lens body at the interface point. In another embodiment, the fiber end face is a small distance away from the interface point to create an air gap. Accordingly, in such an embodiment, the focal point of the lens will be beyond the interface point. In one embodiment, an index matching gel is used between the fiber end face and the interface point. In another embodiment, the interface point is lensed to enhance the optical coupling between the fiber end face and the lens body. In still another embodiment, to facilitate alignment with the interface point and the fiber end face, the interface point is recessed in from the first face—i.e., disposed at the end of a fiber-receiving cavity in the lens body as described below with respect to FIGS. 2 and 3. Still other embodiments of the interface point will be apparent to those of skill in the art in light of this disclosure.

To expand or focus the beam leaving or entering the lens body at the second face, the lens body comprises one or more lenses. In one embodiment, as described with respect to FIGS. 1(*a*)-3(*a*) below, the lenses are convex surfaces molded or machined into the second face of the lens body. The convex surfaces are configured such that their focal point is at the interface point as described above. In one embodiment, the convex surfaces are defined in cavities 106, 206, and 306. Alternatively, in another embodiment, rather than having cavities in the second face to define the convex surfaces, the convex surfaces may protrude from the second face. Although in this embodiment, the abutment of the lens bodies to axially position mating connectors may be compromised as described below. In one embodiment, a discrete lens corresponds to a single fiber or core. In another embodiment, one lens is optically coupled through the lens body to two or more fibers or cores. In one embodiment, the lenses are aspherical.

To mechanically interface with a mating connector and axially position the connector, the lens body has a second face having one or more forward planar portions for contacting a similar lens body of a mating connector. For example, referring to FIGS. 1(*b*), 2(*b*) and 3(*b*), connectors 100, 200 and 300 mechanically contact or engaged with mating connectors 100', 200', and 300' to form mated assemblies 150, 250 and 350, respectively. Specifically, the second face of each lens body has a planar forward portion such that the two lens bodies can be abutted to optically couple the connectors 100, 100'. (A similar arrangement is used with the connectors in FIGS. 2(*b*) and 3(*b*).) This way, the distance between the forward planar portion of the second face 105 and the convex surface 107 (described below) defines half the length of the expanded beam between the connectors. If the convex surface 107 is not recessed in a cavity 106, then to facilitate abutment, the second face may have projections with planar end faces for abutting a similar lens body on a mating connector. Still other techniques for abutting or otherwise mechanically contacting the lens bodies to axially position the connectors will be apparent to one of skill in the art in light of this disclosure.

The lens body may have various embodiments as mentioned above. For example, in the embodiment shown in FIG. 1(*a*), the lens body comprises a first face 104 and a second face 105. The first face 104 comprises an interface point 104*a* for optically coupling with the fiber 102. The second face 105 comprises a cavity 106 which defines a convex surface 107 for either expanding a beam leaving the lens body or focusing a beam entering the lens body.

Referring to FIG. 2(*a*), another embodiment of the lens body 203 is disclosed. The lens body 203 in FIG. 2(*a*) is similar to that of FIG. 1(*a*) except that it has a fiber-receiving cavity 211 for receiving the portion 210 of bare fiber protruding from the end face 209 of the ferrule. As mentioned above, because portion 210 of the bare fiber 202 extends beyond the end face of the ferrule, its end face can be prepared without polishing the ferrule. The interface point 204*a* is not disposed on the first face (as interface point 104*a* is on the first face 104), but is recessed inside the lens body 203 at the end of the fiber-receiving cavity 211. Accordingly, the shape of the convex surface 207 needs to be configured such that its focal point is at the recessed interface point 204*a*. Alternatively, the lens body may longer such that the distance between the interference point 204*a* and the convex surface 207 is about the same as the interface point 104*a* and the convex surface 107 of lens body 103. Still other approaches for positioning the focal point of the convex surface 207 on the interface point 204*a* will be know to one skill in art in light of this disclosure.

In yet another embodiment shown in FIG. 3(*a*), the lens 303 comprises an annular portion 315, which extends rearward from the first face 304. The annular portion 315 comprises an interior surface 315*a*, which is configured to receive the outer surface 302*a* of the buffered fiber 302. This arrangement serves to snugly hold the buffered fiber 302 in the lens body 303, thereby obviating the need for a ferrule. Like the embodiment of FIG. 2(*a*), the first face 304 of the lens body comprises a fiber-receiving cavity 311 for receiving a portion 310 of the fiber protruding from the buffered fiber 302. The interface point 304a is located at the end of the fiber-receiving cavity 311.

Although the invention is illustrated with respect to three different lens bodies, it should be understood that alternative lens bodies exist. For example, in one embodiment, the fiber may be a multi-core fiber as described above. In such an embodiment, the first face would have multiple interface points, and the second face would have multiples lens defined therein such that each lens was coupled to an interface point. As mentioned above, this involves locating the focal point of a given lens at its respective interface point. The configuration of the lens may vary. As mentioned above, the lens may be defined as convex surfaces defined by cavities in the second face or the lens may be convex surfaces that protrude from the second face. In one embodiment, a plurality of convex surfaces is defined in a single cavity. The multi-core fiber may require keying features on the lens body and the fiber such that the lenses align with the relative to the multiple individual lenses. In one embodiment, just one lens is defined in the lens body to couple with the multiple cores. Such a configuration exploits the close proximity of the cores to each other. Still other embodiments will be apparent to one of skill in light of this disclosure.

The lens body may comprise any optically transparent material which is readily moldable, including, for example, PEI (polyetherimide), PESU (polyether sulfone). All of the features of the lens body (e.g. fiber receiving cavities, interface points, lenses, outer periphery, etc.) may be molded in the lens body, or, alternatively, a blank of the lens body may be molded and the features machined therein. In yet another embodiment, some of the features may be molded, while others are machined.

Additional features may be added to the lens body and/or fiber to further improved optical performance. For example, in one embodiment, an anti-reflection coating is applied to the lens to reduce the Fresnel loss. Likewise, in an embodiment in which an air gap exists between the fiber end face and the first face of the lens body (see, e.g. FIG. 2), an anti-reflection coating may be applied to the fiber end face to improve the optical performance.

It should be understood that the foregoing is illustrative and not limiting and that obvious modifications may be made by those skilled in the art without departing from the spirit of the invention. For example, although an expanded beam connector is described above with respect to a ruggedized multi-fiber connector with multiple termini, the expanded beam connector is not limited to ruggedized, multi-fiber connectors, and may be used with any optical connector having just the elements recited in the claims. Accordingly, the specification is intended to cover such alternatives, modifications, and equivalence as may be included within the spirit and scope of the invention as defined in the following claims.

What is claimed is:

1. An expanded-beam connector comprising:
   a compliant sleeve for holding at least one ferrule and one lens body, the sleeve having an interior surface having a certain geometry;
   a fiber having a fiber end face;
   the ferrule having at least one bore hole for receiving the fiber and an end face for presenting the fiber end face, the ferrule having an outer periphery at least a portion of which has the certain geometry such that said interior surface of said sleeve and said at least a portion of said outer periphery of said ferrule contact, thereby holding the ferrule in a precise radial position relative to the sleeve when disposed in the sleeve; and
   the lens body, the lens body being formed with a first face and a second face, the first and second faces being substantially planar, the first face configured for abutting the end face of the ferrule and configured to axially position the end face of the ferrule to optically couple the fiber end face with an interface point of the lens body, the second face having a convex surface, the interface point and the convex surface being optically coupled through the lens body, the lens body having an outer periphery at least a portion of which has the certain geometry such that said interior surface of said sleeve and said at least a portion of said outer periphery of said lens body contact, thereby holding the lens body in a precise radial position relative to the sleeve when disposed in the sleeve.

2. The connector of claim 1, wherein said lens body is molded.

3. The connector of claim 2, wherein said convex surface is aspherical.

4. The connector of claim 1, wherein at least a portion of the end face presenting the fiber end face is shaped to optically couple the fiber end face with the interface point.

5. The connector of claim 1, wherein the first face comprises a fiber-receiving cavity to receive a portion of the fiber protruding from the end face.

6. The connector of claim 5, wherein an air gap exists between the fiber end face and the lens body.

7. The connector of claim 6, wherein the fiber end face and said lens body have an anti-reflection coating.

8. The connector of claim 6, wherein the fiber end face has a slant angle.

9. The connector of claim 5, wherein the end face is not polished.

10. The connector of claim 5, wherein an index matching gel is disposed in the fiber-receiving cavity between the fiber end face and the interface point.

11. The connector of claim 1, wherein the fiber comprises a buffered fiber, and wherein the lens body comprises an annular portion extending from the first face, the annular portion having an inside geometry configured to receive a portion of the buffered fiber.

12. The connector of claim 11, wherein a bare fiber tip extends from the end face of the ferrule, and the first face comprises a fiber-receiving cavity to receive the bare fiber tip.

13. The connector of claim 1, wherein the second face is configured to abut a second face of a mating lens body of a mating connector.

14. The connector of claim 1, wherein the second face comprises a cavity defining the convex surface.

15. The connector of claim 1, further comprising a second connector, the second connector comprising:
   a second compliant sleeve for holding at least one second ferrule and at least one second lens body, the second sleeve having an interior surface having a certain geometry;
   a second fiber having a fiber end face; and
   the second lens body, the second lens body being molded with a first face and a second face, the first and second faces being substantially planar, the first face having an interface point for optically coupling with the fiber end face, the second face having a convex surface, the interface point and the convex surface being optically coupled through the lens body, the lens body having an outer periphery at least a portion of which has the certain geometry such that the lens body is held in a precise radial position relative to the sleeve when disposed in the sleeve.

16. The connector of claim 15, wherein the second faces of the lens body and the second lens body abut, thereby axially positioning their respective convex surfaces.

17. The connector of claim 15, wherein the convex surfaces are configured to be optically coupled with an expanded beam.

18. The connector of claim 1, wherein the lens body is an integrally-molded optically transparent material.

19. The connector of claim 1, wherein the material comprises polyetherimide (PEI) or polyethersulfone (PESU).

20. The connector of claim 1, wherein said certain geometer is cylindrical.

21. The connector of claim 1, wherein said compliant sleeve comprises flexible beams.

* * * * *